(12) United States Patent
Kwon et al.

(10) Patent No.: US 9,219,291 B2
(45) Date of Patent: Dec. 22, 2015

(54) CABLE-TYPE SECONDARY BATTERY

(71) Applicant: LG Chem, Ltd., Seoul (KR)

(72) Inventors: Yo-Han Kwon, Daejeon (KR);
Je-Young Kim, Daejeon (KR);
Sang-Wook Woo, Daejeon (KR);
Heon-Cheol Shin, Busan (KR); Eun-Ji Kim, Busan (KR); Su-Jin Park, Busan (KR); Woo-Sung Choi, Busan (KR)

(73) Assignee: LG Chem, Ltd. (KR)

( * ) Notice: Subject to any disclaimer, the term of this patent is extended or adjusted under 35 U.S.C. 154(b) by 178 days.

(21) Appl. No.: 14/023,786

(22) Filed: Sep. 11, 2013

(65) Prior Publication Data

US 2014/0030569 A1 Jan. 30, 2014

Related U.S. Application Data

(63) Continuation of application No. PCT/KR2012/001789, filed on Mar. 12, 2012.

(30) Foreign Application Priority Data

Mar. 11, 2011 (KR) .................. 10-2011-0021950
Mar. 12, 2012 (KR) .................. 10-2012-0024988

(51) Int. Cl.
*H01M 10/0585* (2010.01)
*H01M 10/0564* (2010.01)
(Continued)

(52) U.S. Cl.
CPC ............ *H01M 10/0587* (2013.01); *H01M 4/04* (2013.01); *H01M 4/131* (2013.01); *H01M 4/133* (2013.01); *H01M 4/366* (2013.01); *H01M 4/485* (2013.01); *H01M 4/525* (2013.01); *H01M 4/5825* (2013.01); *H01M 4/66* (2013.01); *H01M 4/661* (2013.01); *H01M 4/662* (2013.01);
(Continued)

(58) Field of Classification Search
None
See application file for complete search history.

(56) References Cited

U.S. PATENT DOCUMENTS 4,522,897 A * 6/1985 Walsh ........................ 429/119
6,210,827 B1 4/2001 Dopp et al.
(Continued)

FOREIGN PATENT DOCUMENTS

GB 150961 A 1/1922
GB 573795 A 12/1945
(Continued)

OTHER PUBLICATIONS

International Search Report for Application No. PCT/KR2012/001789 dated Oct. 10, 2012.

*Primary Examiner* — Cynthia K Walls
(74) *Attorney, Agent, or Firm* — Lerner, David, Littenberg, Krumholz & Mentlik, LLP

(57) ABSTRACT

The present invention provides a cable-type secondary battery comprising an inner electrode which includes at least one first polarity electrode having a first polarity current collector with a long and thin shape, whose cross-section perpendicular to its longitudinal direction is a circular, oval or polygonal form; a first polarity electrode active material layer formed on an outer surface of the first polarity current collector; and an electrolyte layer filled to surround the first polarity electrode active material layer, and at least one wire-type second polarity electrode which wholly surrounds the inner electrode and is winding around the exterior thereof.
Thus, the inventive cable-type secondary battery provided with an outer winding electrode has excellent flexibility to prevent the release of the active material.

11 Claims, 2 Drawing Sheets

(51) Int. Cl.

| | |
|---|---|
| *H01M 10/0587* | (2010.01) |
| *H01M 4/04* | (2006.01) |
| *H01M 4/36* | (2006.01) |
| *H01M 10/02* | (2006.01) |
| *H01M 4/75* | (2006.01) |
| *H01M 10/0525* | (2010.01) |
| *H01M 10/058* | (2010.01) |
| *H01M 10/05* | (2010.01) |
| *H01M 10/0565* | (2010.01) |
| *H01M 4/131* | (2010.01) |
| *H01M 4/133* | (2010.01) |
| *H01M 4/485* | (2010.01) |
| *H01M 4/525* | (2010.01) |
| *H01M 4/58* | (2010.01) |
| *H01M 4/66* | (2006.01) |
| *H01M 4/78* | (2006.01) |
| *H01M 10/052* | (2010.01) |
| *H01M 10/0568* | (2010.01) |
| *H01M 6/34* | (2006.01) |

(52) U.S. Cl.
CPC .............. *H01M 4/663* (2013.01); *H01M 4/666* (2013.01); *H01M 4/668* (2013.01); *H01M 4/75* (2013.01); *H01M 4/78* (2013.01); *H01M 10/02* (2013.01); *H01M 10/05* (2013.01); *H01M 10/052* (2013.01); *H01M 10/058* (2013.01); *H01M 10/0525* (2013.01); *H01M 10/0565* (2013.01); *H01M 10/0568* (2013.01); *H01M 6/34* (2013.01); *Y02E 60/122* (2013.01)

(56) References Cited

U.S. PATENT DOCUMENTS

| | | | |
|---|---|---|---|
| 6,461,762 | B1 | 10/2002 | Yang et al. |
| 2002/0150820 | A1* | 10/2002 | Kanai et al. ................ 429/231.1 |
| 2006/0105233 | A1 | 5/2006 | Morita |
| 2007/0243456 | A1 | 10/2007 | Ahn et al. |
| 2008/0137890 | A1 | 6/2008 | Petersen et al. |
| 2010/0203372 | A1 | 8/2010 | Kim et al. |
| 2011/0262809 | A1* | 10/2011 | Kumagai et al. ............. 429/211 |
| 2013/0149580 | A1* | 6/2013 | Kim ............................... 429/94 |

FOREIGN PATENT DOCUMENTS

| | | | | |
|---|---|---|---|---|
| JP | 09-007629 | A | 1/1997 | |
| JP | 2002-42855 | A | 2/2002 | |
| JP | 2002-157997 | A | 5/2002 | |
| JP | 2006147300 | A | 6/2006 | |
| JP | 2008-529208 | A | 7/2008 | |
| KR | 20050099903 | A | 10/2005 | |
| KR | 20070009231 | A | 1/2007 | |
| KR | 100804411 | B1 | 2/2008 | |
| KR | 100813309 | B1 | 3/2008 | |
| KR | 20090009598 | A | 1/2009 | |
| WO | WO 2010/052950 | * | 5/2010 | ............. H01M 4/48 |

* cited by examiner

CABLE-TYPE SECONDARY BATTERY

CROSS-REFERENCE TO RELATED APPLICATION

This application is a continuation of International Application No. PCT/KR2012/001789 filed on Mar. 12, 2012, which claims priority under 35 USC 119(a) to Korean Patent Application Nos. 10-2011-0021950 and 10-2012-0024988 filed in the Republic of Korea on Mar. 11, 2011 and Mar. 12, 2012, respectively, the entire contents of which are incorporated herein by reference.

TECHNICAL FIELD

The present invention relates to a cable-type secondary battery, which can freely change in shape.

BACKGROUND ART

Recently, the development of wireless communication technology has contributed to the popularization of mobile devices. In response to the development of wireless communication technology, secondary batteries are essentially used as a power supply for mobile devices. Meanwhile, electric vehicles, hybrid vehicles and the like that have been developed to prevent environmental pollution are also powered by secondary batteries.

Thus, the use of secondary batteries has been increasing in various industrial fields, and their output, capacity and structure are diversifying according to the characteristics of the industrial field in which the secondary batteries are used.

Generally, a secondary battery comprises an electrode assembly including an anode and a cathode, which are formed by applying active materials on both sides of a plate-shaped current collector, and a separator interposed between the anode and the cathode. The electrode assembly is received in a cylindrical or prismatic metal can or in a pouch-type case made of an aluminum laminate sheet together with a liquid electrolyte or a solid electrolyte. Moreover, the electrode assembly may have a structure, in which a plurality of jelly-roll type or thin plate-like unit electrodes each including sheet-shaped anode/separator/cathode are sequentially stacked, so as to increase the capacity of the secondary battery. Therefore, the electrodes (such as anode and cathode) of the electrode assembly essentially have a plate shape.

This conventional plate-shaped electrode structure has an advantage of achieving a high degree of integration during winding or stacking of the electrode assembly. However, depending on the necessity of the industrial field, it is very difficult to modify the structure of the plate-shaped electrode. Moreover, the plate-shaped electrode structure is sensitive to changes in the volume of electrodes during charging and discharging cycles. Furthermore, the gas generated in the cells is not easily discharged to the outside, which can result in problems such as high potential difference between the electrodes.

In particular, to meet the various needs of the consumers, the types of devices using secondary batteries are diversifying and the design of the devices are becoming very important. For these special types of devices to create a separate area or room so to mount secondary batteries having a conventional structure and/or shape (such as cylindrical, prismatic, or pouch type) can be considered a significant obstacle in the expansion of wireless technology or to the introduction of new designs. For example, if a newly developed device has a long and narrow space in which a secondary battery is to be mounted, it is essentially impossible or ineffective to modify the structure of the secondary battery including an electrode assembly using plate-shaped electrodes as a basis so to mount the secondary battery in the device. That is, since the conventional cylindrical, coin-type and prismatic batteries are formed to have specific shapes, they cannot freely change in shape and are limited in the use thereof. Moreover, they have a problem of not being able to bend or twist to meet their intended use.

In order to solve the above problems, the present applicant discloses "an electrode assembly of a novel structure and a secondary battery comprising the same" (filed on Jan. 17, 2006 and registered on Feb. 12, 2008 as Korean Patent No. 10-0804411), the entire contents of which are incorporated herein by reference.

However, such a secondary battery (hereinafter, referred to as a "cable-type secondary battery") has insufficient flexibility. Moreover, in the case the cable-type secondary battery is excessively deformed by the application of an external force, the active materials may be released.

DISCLOSURE

Technical Problem

The present invention is designed to solve the problems of the prior art, and therefore it is an object of the present invention to provide a secondary battery with an improved structure which can easily change in shape and can maintain excellent stability and performance.

Technical Solution

In order to achieve the objects, the present invention provides a cable-type secondary battery comprising an inner electrode which includes at least one first polarity electrode having a first polarity current collector with a long and thin shape, whose cross-section perpendicular to its longitudinal direction is a circular, oval or polygonal form; a first polarity electrode active material layer formed on an outer surface of the first polarity current collector; and an electrolyte layer filled to surround the first polarity electrode active material layer, and at least one wire-type second polarity electrode which wholly surrounds the inner electrode and is winding around the exterior thereof.

The first polarity electrode active material layer formed on an outer surface of the first polarity current collector comprises at least two first polarity electrode active material layers to be spaced apart from each other at a predetermined interval in the longitudinal direction.

In the present invention, the current collector used is preferably made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; or a conductive polymer. The conductive material may include polyacetylene, polyaniline, polypyrrole, polythiophene, polysulfurnitride, indium tin oxide (ITO), copper, silver, palladium, nickel, etc. The conductive polymer may include polyacetylene, polyaniline, polypyrrole, polythiophene, polysulfurnitride, etc.

For the active material layer, an anode active material layer may be made of natural graphite, artificial graphite, or carbonaceous material; lithium-titanium complex oxide (LTO), a metal (Me) such as Si, Sn, Li, Zn, Mg, Cd, Ce, Ni or Fe; an alloy of the metals; a metal oxide (MeOx) of the metal(Me);

a complex of the metal(Me) and carbon; and a mixture thereof. Also, a cathode active layer may be made of $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$).

The electrolyte layer may be made of a gel-type polymer electrolyte using PEO, PVdF, PMMA, PAN or PVAC, or a solid electrolyte using PEO, polypropylene oxide (PPO), polyethylene imine (PEI), polyethylene sulfide (PES) or polyvinyl acetate (PVAc).

In the cable-type secondary battery, the electrolyte layer may further include a lithium salt. The lithium salt may include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic lithium carbonate, and lithium tetraphenylborate.

The first polarity may be a cathode, and the second polarity, an anode. Alternatively, the first polarity may be an anode, and the second polarity, a cathode.

Advantageous Effects

In accordance with the present invention, the inventive cable-type secondary battery is provided with an outer winding electrode to improve flexibility and reduce the occurrence of a short circuit, unlike a foil-type electrode in which a sharp portion may be formed by deformation to cause the short circuit. Also, the winding electrode can easily change in shape to disperse a force applied to the active material layer thereof, thereby preventing the release of the active material layer. Furthermore, the use of the winding electrode can increase a surface contact between the electrodes to reduce the resistance of a battery and improve the rate characteristics thereof, thereby enhancing battery performances.

DESCRIPTION OF THE DRAWINGS

The accompanying drawings illustrate preferred embodiments of the present invention and together with the foregoing disclosure, serve to provide further understanding of the technical spirit of the present invention. However, the present invention is not to be construed as being limited to the drawings.

BEST MODE

Figure 1:
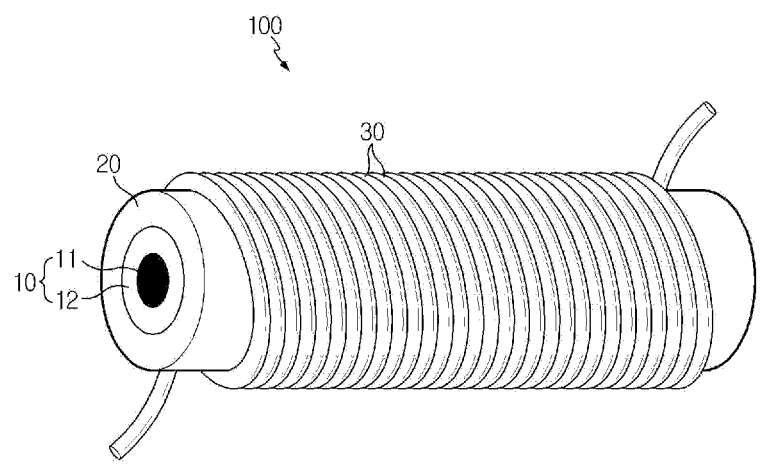
FIG. 1 schematically shows a cable-type secondary battery provided with one winding electrode in accordance with one embodiment of the present invention.

Hereinafter, preferred embodiments of the present invention will be described in detail with reference to the accompanying drawings. The configurations illustrated in the drawings are just preferable examples for the purpose of illustrations only, not intended to limit the scope of the disclosure, so it should be understood that other equivalents and modifications could be made thereto without departing from the spirit and scope of the disclosure.

Figure 2:
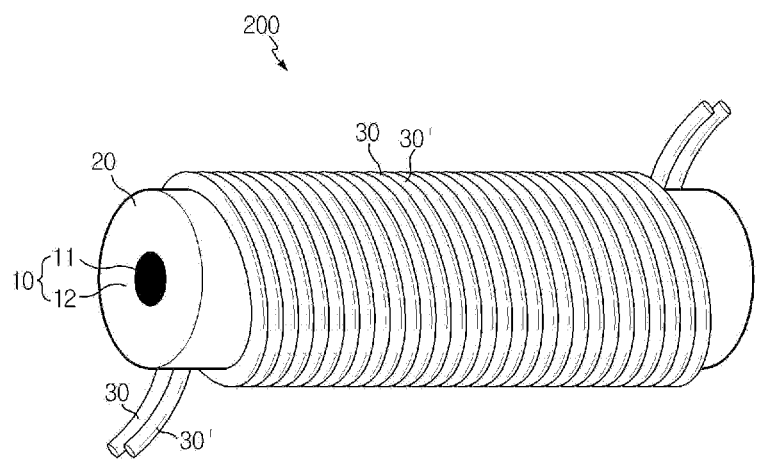
FIG. 2 schematically shows a cable-type secondary battery provided with two winding electrodes in accordance with one embodiment of the present invention.

FIGS. 1 and 2 schematically show a cable-type secondary battery in accordance with one embodiment of the present invention. In the figures, the same reference numerals denote the same or similar elements.

Referring to FIG. 1, a cable-type secondary battery 100 of the present invention includes an inner electrode which includes at least one first polarity electrode having a first polarity current collector 11 with a long and thin shape, whose cross-section perpendicular to its longitudinal direction is a circular, oval or polygonal form; a first polarity electrode active material layer 12 formed on an outer surface of the first polarity current collector; and an electrolyte layer 20 filled to surround the first polarity electrode active material layer, and at least one wire-type second polarity electrode 30 which wholly surrounds the inner electrode and is winding around the exterior thereof.

The cable-type secondary battery of the present invention has a linear structure, which extends in the longitudinal direction, and flexibility, and thus can freely change in shape. The first polarity current collector may have, but is not limited to, a cross section of a circular, oval or polygonal shape, and the polygonal shape may be, for example, a triangular, square or hexagonal shape.

Figure 4:
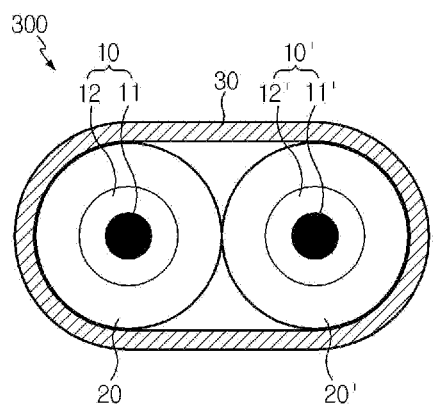
FIG. 4 is a cross-sectional view showing a cable-type secondary battery provided with two first polarity electrodes in accordance with one embodiment of the present invention.

The inner electrode of the present invention comprises at least one first polarity electrode to easily control the balance of the battery. Also, the use of a plurality of the first polarity electrodes can prevent the stop of battery operation even when the short circuit occurs in one of the first polarity electrode due to deformation. FIG. 4 shows a cable-type secondary battery 300 of the present invention provided with two first polarity electrodes, 10 and 10'. The electrolyte layer 20 is formed on an outer surface of the first polarity electrode and serves as an ion channel. Alternatively, a separator may be used instead of the electrolyte layer, which requires a further impregnation into an electrolyte in a battery assembling process.

The cable-type secondary battery of the present invention is provided with at least one wire-type second polarity electrode 30 which may be made by forming an electrode active material on the surface of a wire-type current collector. The wire-type second polarity electrode 30 can easily change in shape and has a certain level of elasticity to have superior flexibility, thereby improving the overall flexibility of the cable-type battery. The conventional foil-type electrode generally has a sharp portion formed by deformation so there exists the potential to penetrate the electrolyte layer, thereby causing a short circuit, whereas the wire-type second polarity electrode 30 of the present invention is not apt to twist or bend, which reduces the potential for a sharp portion caused by deformation to penetrate the electrolyte layer to cause a short circuit. Also, the wire-type second polarity electrode 30 of the present invention densely winds around the exterior of the inner electrode to increase the surface contact between the electrodes and thus reduce the resistance of a battery and improve rate characteristics thereof, thereby enhancing battery performances.

At least one such wire-type second polarity electrode 30 may be used and the cable-type secondary battery 200 uses two wire-type second polarity electrodes 30 and 30', as shown in FIG. 2, to reduce a short circuit.

Figure 3:
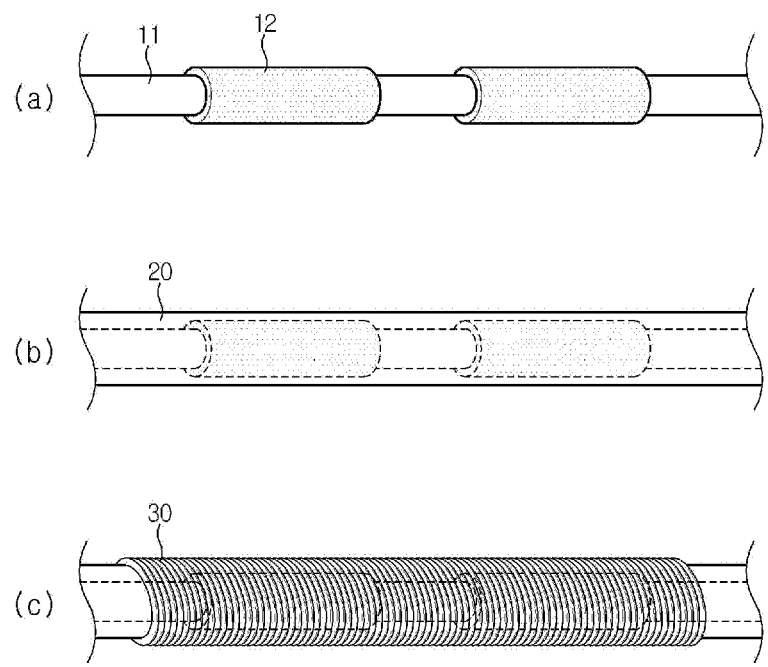
FIG. 3 shows a method for manufacturing a cable-type secondary battery in accordance with one embodiment of the present invention.

Also, the first polarity electrode active material layer of the present invention may comprise at least two first polarity electrode active material layers to be spaced apart from each other at a predetermined interval. For example, as shown in FIG. 3, the first polarity electrode active material layer 12 may be coated in the form of pattern layers uniformly spaced apart from each other. An uncoated region where the electrode active material layer is not formed has high flexibility to enhance the overall flexibility of the cable-type secondary battery, thereby preventing the release of the first polarity electrode active material layer 12. Particularly, only the region where the electrode active material layers are formed is wound with the wire-type second polarity electrode 30, without winding the uncoated region where the electrode active material layer is not formed, to maximize the flexibility.

The electrode active material layer of the present invention includes an electrode active material, a binder and a conductive material, and is coupled to the current collector to form an electrode. When the electrode is deformed such by being folded or being severely bent by an external force, the electrode active material may be released from the electrode active material layer, thereby reducing the performance and capacity of the battery. However, the cable-type secondary battery of the present invention has an outer winding electrode 30 to uniformly disperse an excessive external force applied to the cable-type secondary battery of the present invention, thereby preventing the release of the active material layer.

The electrode active material layer of the present invention allow ions to move through the current collector, and the movement of ions is caused by the interaction of ions such as intercalation/deintercalation of ions into and from the electrolyte layer 20.

The current collector is preferably made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; or a conductive polymer.

The current collector serves to collect electrons generated by electrochemical reaction of the active material or to supply electrons required for the electrochemical reaction. In general, the current collector is made of a metal such as copper or aluminum. Especially, when the current collector is made of a non-conductive polymer treated with a conductive material on the surface thereof or a conductive polymer, the current collector has a relatively higher flexibility than the current collector made of a metal such as copper or aluminum. Also, a polymer current collector may be used instead of the metal current collector to reduce the weight of the battery.

The conductive material may include polyacetylene, polyaniline, polypyrrole, polythiophene, polysulfurnitride, indium tin oxide (ITO), copper, silver, palladium, nickel, etc. The conductive polymer may include polyacetylene, polyaniline, polypyrrole, polythiophene, polysulfurnitride, etc. However, the type of the non-conductive polymer used for the current collector is not particularly limited.

The first polarity may be a cathode, and the second polarity, an anode. Alternatively, the first polarity may be an anode, and the second polarity, a cathode.

Non-limiting examples of materials for the anode active material layer may include natural graphite, artificial graphite, or carbonaceous material; lithium-titanium complex oxide (LTO), a metal (Me) such as Si, Sn, Li, Zn, Mg, Cd, Ce, Ni or Fe; an alloy of the metals; a metal oxide (MeOx) of the metals; and a complex of the metal and carbon.

Non-limiting examples of materials for the cathode active material layer may include $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$).

In the cable-type secondary battery of the present invention, the electrolyte layer 20 is filled to surround the first polarity electrode active material layers. Preferably, the electrolyte layer serving as an ion channel may be made of a gel-type polymer electrolyte using PEO, PVdF, PMMA, PAN or PVAC, or a solid electrolyte using PEO, polypropylene oxide (PPO), polyethylene imine (PEI), polyethylene sulfide (PES) or polyvinyl acetate (PVAc). The matrix of the solid electrolyte is preferably formed using a polymer or a ceramic glass as the backbone. In the case of typical polymer electrolytes, ions move very slowly in terms of reaction rate, even when the ionic conductivity is satisfied. Thus, the gel-type polymer electrolyte which facilitates the movement of ions is preferably used compared to the solid electrolyte. The gel-type polymer electrolyte has poor mechanical properties and thus may include a porous support or a cross-linked polymer to improve the poor mechanical properties. The electrolyte layer of the present invention can serve as a separator, and thus an additional separator may be omitted.

The electrolyte layer 20 of the present invention may further include a lithium salt. The lithium salt can improve an ionic conductivity and response time. Non-limiting examples of the lithium salt may include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic lithium carbonate, and lithium tetraphenylborate.

The cable-type secondary battery of the present invention may include a cover member. The cover member is an insulator and is formed to surround the electrode assembly such that the electrode can be protected from moisture in the air and external impacts. The cover member may be made of conventional polymer resins, for example, PVC, HDPE or epoxy resin.

Next, a method for manufacturing a cable-type secondary battery having the above-described structure will be briefly described with reference to FIG. 3.

First, a first polarity current collector in the form of a long and thin wire, whose cross-section perpendicular to the longitudinal direction is circular, oval or polygonal, is coated with active material layers on the surface thereof (Step a).

The first polarity electrode active material layers may be formed by typical coating methods, for example, by continuously or discontinuously extrusion-coating an electrode slurry containing an active material using an extruder. At this time, the active material layers may be intermittently coated to maintain a predetermined interval.

Then, an electrolyte layer is formed to surround the first polarity electrode active material layers (Step b).

The method for forming the electrolyte layer is not particularly limited, but an extrusion coating method is preferably used to facilitate the manufacturing process due to the nature of the linear cable-type secondary battery.

The electrolyte layer is surrounded with a second polarity electrode on the outer surface thereof (Step c).

The second polarity electrode may be manufactured by pre-winding prior to inserting the first polarity electrode coated with the electrolyte layer thereto. The second polarity electrode may also be prepared by coating the surface of the current collector with an active material to form second polarity electrode active material layers. The second polarity electrode active material layers may be formed by typical coating methods, for example, by an electroplating process or an anodic oxidation process. Also, a continuous extrusion-coating of an electrode slurry containing an active material using an extruder may be used.

The electrode assembly thus manufactured may be surrounded by a cover member to provide a cable-type secondary battery. The cover member is an insulator and is formed on the outermost surface to protect electrodes from moisture in the air and external impacts. The cover member may be made of conventional polymer resins, for example, PVC, HDPE or epoxy resin.

INDUSTRIAL APPLICABILITY

The present invention has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description..

What is claimed is:

1. A cable-type secondary battery comprising:
   an inner electrode which includes at least one first polarity electrode having a first polarity current collector with a long and thin shape, whose cross-section perpendicular to its longitudinal direction is a circular, oval or polygonal form; a first polarity electrode active material layer formed on an outer surface of the first polarity current collector; and an electrolyte layer filled to surround the first polarity electrode active material layer, and
   at least one wire-type second polarity electrode which wholly surrounds the inner electrode and is winding around the exterior thereof.

2. The cable-type secondary battery of claim 1, wherein the first polarity electrode active material layer formed on the outer surface of the first polarity current collector comprises at least two first polarity electrode active material layers to be spaced apart from each other at a predetermined interval in the longitudinal direction.

3. The cable-type secondary battery of claim 1, wherein the first polarity electrode active material layer comprises an active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), and a mixture thereof.

4. The cable-type secondary battery of claim 1, wherein the second polarity electrode comprises an active material layer made of an active material selected from the group consisting of natural graphite, artificial graphite, or carbonaceous material; lithium-titanium complex oxide (LTO), a metal (Me) such as Si, Sn, Li, Zn, Mg, Cd, Ce, Ni or Fe; an alloy of the metals; a metal oxide (MeOx) of the metal; a complex of the metal and carbon; and a mixture thereof.

5. The cable-type secondary battery of claim 1, wherein the first polarity current collector and a current collector of the second polarity electrode comprises one selected from the group consisting of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; and a conductive polymer.

6. The cable-type secondary battery of claim 5, wherein the conductive material is selected from the group consisting of polyacetylene, polyaniline, polypyrrole, polythiophene, polysulfurnitride, indium tin oxide (ITO), copper, silver, palladium, nickel, and a mixture thereof.

7. The cable-type secondary battery of claim 5, wherein the conductive polymer is selected from the group consisting of polyacetylene, polyaniline, polypyrrole, polythiophene, polysulfurnitride, and a mixture thereof.

8. The cable-type secondary battery of claim 1, wherein the electrolyte layer comprises one selected from a group consisting of a gel-type polymer electrolyte using PEO, PVdF, PMMA, PAN or PVAC; and a solid electrolyte using PEO, polypropylene oxide (PPO), polyethylene imine (PEI), polyethylene sulfide (PES) or polyvinyl acetate (PVAc).

9. The cable-type secondary battery of claim 1, wherein the electrolyte layer further comprises a lithium salt.

10. The cable-type secondary battery of claim 9, wherein the lithium salt is selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic lithium carbonate, lithium tetraphenylborate, and a mixture thereof.

11. The cable-type secondary battery of claim 1, wherein the first polarity is a cathode and the second polarity is an anode.

\* \* \* \* \*